United States Patent
Inoue et al.

(10) Patent No.: US 11,508,528 B2
(45) Date of Patent: Nov. 22, 2022

(54) ELECTROLYTIC CAPACITOR AND METHOD FOR PRODUCING SAME

(71) Applicant: Panasonic Intellectual Property Management Co., Ltd., Osaka (JP)

(72) Inventors: Masamichi Inoue, Osaka (JP); Syusaku Koie, Kyoto (JP); Makoto Nagashima, Kyoto (JP)

(73) Assignee: PANASONIC INTRLLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/299,773

(22) PCT Filed: Dec. 11, 2019

(86) PCT No.: PCT/JP2019/048472
§ 371 (c)(1),
(2) Date: Jun. 3, 2021

(87) PCT Pub. No.: WO2020/137548
PCT Pub. Date: Jul. 2, 2020

(65) Prior Publication Data
US 2022/0122779 A1  Apr. 21, 2022

(30) Foreign Application Priority Data

Dec. 27, 2018 (JP) .............................. JP2018-244468

(51) Int. Cl.
*H01G 9/042* (2006.01)
*H01G 9/15* (2006.01)
(Continued)

(52) U.S. Cl.
CPC ......... *H01G 9/0425* (2013.01); *H01G 9/0029* (2013.01); *H01G 9/048* (2013.01); *H01G 9/15* (2013.01)

(58) Field of Classification Search
CPC combination set(s) only.
See application file for complete search history.

(56) References Cited

U.S. PATENT DOCUMENTS

| 4,166,286 A | * | 8/1979 | Boissonnault | ........... | H01G 9/06 361/532 |
| 2009/0161299 A1 | * | 6/2009 | Nemoto | ................ | H01G 2/065 29/25.03 |

FOREIGN PATENT DOCUMENTS

| JP | 2003-173937 | 6/2003 |
| JP | 2004-281714 | 10/2004 |

(Continued)

OTHER PUBLICATIONS

International Search Report of PCT application No. PCT/JP2019/048472 dated Mar. 3, 2020.
(Continued)

*Primary Examiner* — David M Sinclair
(74) *Attorney, Agent, or Firm* — McDermott Will & Emery LLP

(57) ABSTRACT

An electrolytic capacitor includes a capacitor element having: an anode; a dielectric layer covering at least a part of the anode body; a solid electrolyte layer covering at least a part of the dielectric layer; and a cathode lead-out layer covering at least a part of the solid electrolyte layer. The cathode lead-out layer includes a carbon layer covering at least a part of the solid electrolyte layer, a first metal layer covering at least a part of the carbon layer, and a second metal layer covering at least a part of the first metal layer. The first metal layer contains first metal particle, and the second metal layer contains second metal particles and a second binder resin. The first metal layer contains no binder resin, or contains a first binder resin in a volume ratio smaller than a volume ratio of the second binder resin contained in the second metal layer.

24 Claims, 5 Drawing Sheets

(51) Int. Cl.
*H01G 9/00* (2006.01)
*H01G 9/048* (2006.01)

(56) References Cited

FOREIGN PATENT DOCUMENTS

| | | | |
|---|---|---|---|
| JP | 2005086125 A | * | 3/2005 |
| JP | 2006-013031 | | 1/2006 |
| JP | 2008-010719 A | | 1/2008 |
| JP | 2009-252881 | | 10/2009 |
| JP | 2013-165204 | | 8/2013 |
| KR | 20120051986 A | * | 5/2012 |

OTHER PUBLICATIONS

English Translation of Chinese Office Action dated Mar. 29, 2022 for the related Chinese Patent Application No. 201980085640.8.

* cited by examiner

ELECTROLYTIC CAPACITOR AND METHOD FOR PRODUCING SAME

TECHNICAL FIELD

The present invention relates to an electrolytic capacitor and a method for producing the same, and more particularly to an improvement in a cathode lead-out layer.

BACKGROUND

An electrolytic capacitor includes a capacitor element and an exterior body covering the capacitor element. The capacitor element includes an anode body, a dielectric layer formed on the anode body, a solid electrolyte layer formed on the dielectric layer, and a cathode lead-out layer formed on the solid electrolyte layer. The cathode lead-out layer usually has a carbon layer formed on the solid electrolyte layer and a silver paste layer formed on the carbon layer. The silver paste layer has a great influence on the equivalent series resistance (ESR) of the electrolytic capacitor. Thus, Unexamined Japanese Patent Publication No. 2004-381714, Unexamined Japanese Patent Publication No. 2006-13031, and Unexamined Japanese Patent Publication No. 2013-165204 disclose variously improved silver paste layers.

Patent Literature

SUMMARY

It is difficult to reduce the ESR even if the silver paste layers described in Patent Literatures Unexamined Japanese Patent Publication No. 2004-281714, Unexamined Japanese Patent Publication No. 2006-13031, and Unexamined Japanese Patent Publication No. 2013-165204 are used.

A first aspect of the present invention relates to an electrolytic capacitor. The electrolytic capacitor includes a capacitor element having: an anode body; a dielectric layer covering at least a part of the anode body; a solid electrolyte layer covering at least a part of the dielectric layer; and a cathode lead-out layer covering at least a part of the solid electrolyte layer. The cathode lead-out layer includes a carbon layer covering at least a part of the solid electrolyte layer, a first metal layer covering at least a part of the carbon layer, and a second metal layer covering at least a part of the first metal layer. The first metal layer contains first metal particles, and the second metal layer contains second metal particles and a second binder resin. The first metal layer contains no binder resin, or contains a first binder resin in a volume proportion smaller than a volume proportion of the second binder resin contained in the second metal layer.

A second aspect of the present invention relates to an electrolytic capacitor. The electrolytic capacitor includes a capacitor element having: an anode body; a dielectric layer covering at least a part of the anode body; a solid electrolyte layer covering at least a part of the dielectric layer; and a cathode lead-out layer covering at least a part of the solid electrolyte layer. The cathode lead-out layer includes a carbon layer covering at least a part of the solid electrolyte layer, a first metal layer covering at least a part of the carbon layer, and a second metal layer covering at least a part of the first metal layer. The first metal layer contains first metal particles, and the second metal layer contains second metal particles. A volume proportion of the first metal particles in the first metal layer is greater than a volume proportion of the second metal particles in the second metal layer.

A third aspect of the present invention relates to an electrolytic capacitor. The electrolytic capacitor includes a capacitor element having: an anode body; a dielectric layer covering at least a part of the anode body; a solid electrolyte layer covering at least a part of the dielectric layer; and a cathode lead-out layer covering at least a part of the solid electrolyte layer. The cathode lead-out layer includes a carbon layer covering at least a part of the solid electrolyte layer, a first metal layer covering at least a part of the carbon layer, and a second metal layer covering at least a part of the first metal layer. The first metal layer contains first metal particles, and the second metal layer contains second metal particles. The second metal layer covers at least a part of a periphery of the first metal layer. An average particle size of the first metal particles is smaller than an average particle size of the second metal particles.

A fourth aspect of the present invention relates to a method for producing an electrolytic capacitor. The method includes the steps of: forming a dielectric layer to cover at least a part of an anode body; forming a solid electrolyte layer to cover at least a part of the dielectric layer; adhering a carbon paste to at least a part of the solid electrolyte layer to form a carbon layer; adhering a first metal paste to at least a part of the carbon layer; and adhering a second metal paste to cover at least a part of the first metal paste. The first metal paste contains first metal particles, and the second metal paste contains second metal particles and a second binder resin. The first metal paste contains no binder resin, or contains a first binder resin in a mass proportion in a solid content of the first metal paste smaller than a mass proportion of the second binder resin in a solid content of the second metal paste.

A fifth aspect of the present invention relates to a method for producing an electrolytic capacitor. The method include the steps of: forming a dielectric layer to cover at least a part of an anode body; forming a solid electrolyte layer to cover at least a part of the dielectric layer; adhering a carbon paste to at least a part of the solid electrolyte layer to form a carbon layer; adhering a first metal paste to at least a part of the carbon layer; and adhering a second metal paste to cover at least a part of the first metal paste. The first metal paste contains first metal particles, and the second metal paste contains second metal particles. An average particle size of the first metal particles is smaller than an average particle size of the second metal particles. The second metal paste is adhered to cover at least a part of a periphery of the first metal paste.

According to the present invention, the ESR of the electrolytic capacitor can be reduced.

DESCRIPTION OF EMBODIMENT

Figure 1:
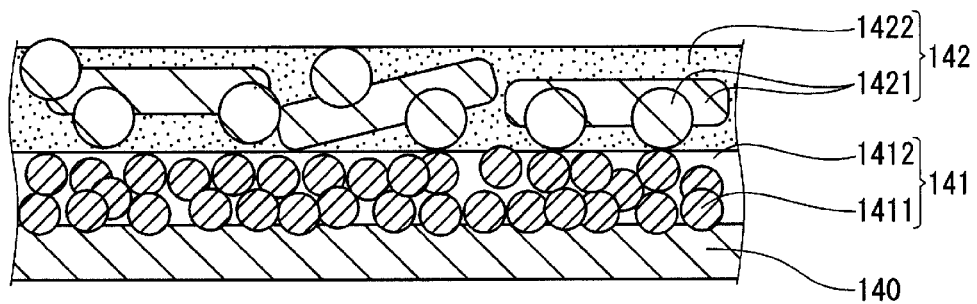
FIG. 1 is a cross-sectional view schematically illustrating a part of a cathode lead-out layer according to one exemplary embodiment of the present invention.

As one of the causes that the ESR is not sufficiently reduced, it is considered that the contact resistance between a silver paste layer and a carbon layer is still large. The silver paste layer is usually formed by preparing a paste with silver particles added to a binder resin and coating it to the carbon layer. Since this binder resin is interposed between the silver particles and carbon particles contained in the carbon layer, the contact resistance between the layers is not sufficiently reduced.

Thus, in the present exemplary embodiment, a layer corresponding to the silver paste layer includes at least two layers (first metal layer and second metal layer), in which: (first aspect) a volume proportion of a binder resin in a layer (first metal layer) that is adjacent to the carbon layer and covers at least a part of the carbon layer is made small; (second aspect) a volume proportion of a metal material contained in the first metal layer is made large; or (third aspect) an average particle size of metal particles contained in the first metal layer is made small and a periphery of the first metal layer is covered with the second metal layer. Thereby, the contact resistance between the first metal layer and the carbon layer becomes sufficiently small, so that the ESR can be reduced.

Hereinafter, each aspect will be described.

[First Aspect]

In the present aspect, the first metal layer contains first metal particles, and the second metal layer contains second metal particles and a second binder resin. The first metal layer contains no binder resin, or a volume proportion of a binder resin (first binder resin) in the first metal layer is smaller than a volume proportion of a binder resin (second binder resin) in the second metal layer. Thereby, the first metal particles can easily come into contact with the carbon particles contained in the carbon layer, so that the contact resistance between the first metal layer and the carbon layer is reduced.

Since the second metal layer contains the second metal particles, a resistance value of an entirety of the cathode lead-out layer can be reduced. Further, since the second metal layer contains the second binder resin, peeling of the first metal layer from the carbon layer is suppressed. That is, the second metal layer exhibits and maintains the effects due to the first metal layer.

The volume proportion of the first metal particles in the first metal layer may be greater than the volume proportion of the second metal particles in the second metal layer. Thereby, the first metal particles and the carbon particles contained in the carbon layer can more easily come into contact with each other, so that the contact resistance between the first metal layer and the carbon layer is more likely to be reduced.

When viewed from the normal direction of the cathode lead-out layer, an area of the second metal layer may be larger than an area of the first metal layer. Since an entirety of the first metal layer is covered with the second metal layer, the adhesion between the first metal layer and the carbon layer is enhanced, so that the peeling of the first metal layer from the carbon layer can be easily suppressed. Thereby, the contact resistance between the first metal layer and the carbon layer is more likely to be reduced.

An average particle size of the first metal particles may be smaller than an average particle size of the second metal particles. Thereby, even when the surface of the carbon layer is uneven, the first metal particles can easily come into contact with the carbon particles contained in the carbon layer, so that the contact resistance between the first metal layer and the carbon layer is more likely to be reduced.

[Second Aspect]

In the present aspect, the first metal layer contains first metal particles, and the second metal layer contains second metal particles. A volume proportion of the first metal particles in the first metal layer is greater than a volume proportion of the second metal particles in the second metal layer. Thereby, the first metal particles can easily come into contact with the carbon particles contained in the carbon layer, so that the contact resistance between the first metal layer and the carbon layer is reduced.

Since the second metal layer contains the second metal particles, a resistance value of an entirety of the cathode lead-out layer can be reduced. That is, the second metal layer exhibits the effects due to the first metal layer.

The second metal layer may contain a second binder resin. The first metal layer may contain no binder resin, or a volume proportion of a first binder resin in the first metal layer may be smaller than a volume proportion of the second binder resin in the second metal layer. Thereby, the first metal particles and the carbon particles contained in the carbon layer can easily come into contact with each other, so that the contact resistance between the first metal layer and the carbon layer is more likely to be reduced.

When viewed from the normal direction of the cathode lead-out layer, an area of the second metal layer may be larger than an area of the first metal layer. Since an entirety of the first metal layer is covered with the second metal layer, the adhesion between the first metal layer and the carbon layer is enhanced, so that the peeling of the first metal layer from the carbon layer can be easily suppressed. Thereby, the contact resistance between the first metal layer and the carbon layer is more likely to be reduced.

An average particle size of the first metal particles may be smaller than an average particle size of the second metal particles. Thereby, even when the surface of the carbon layer is uneven, the first metal particles can easily come into contact with the carbon particles contained in the carbon layer, so that the contact resistance between the first metal layer and the carbon layer is more likely to be reduced.

[Third Aspect]

In the present aspect, the first metal layer contains first metal particles, and the second metal layer contains second metal particles. When viewed from the normal direction of the cathode lead-out layer, the second metal layer covers at least a part of the periphery of the first metal layer, and an average particle size of the first metal particles is smaller than an average particle size of the second metal particles.

Since the average particle size of the first metal particles is smaller than the average particle size of the second metal particles, the first metal particles can easily come into contact with the carbon particles contained in the carbon layer even when the surface of the carbon layer is uneven. So, the contact resistance between the first metal layer and the carbon layer is reduced.

Since the second metal layer contains the second metal particles, a resistance value of an entirety of the cathode lead-out layer can be reduced. Further, since at least a part of the periphery of the first metal layer is covered with the second metal layer, the adhesion between the first metal layer and the carbon layer is enhanced, so that the peeling of the first metal layer from the carbon layer is suppressed. That is, the second metal layer exhibits and maintains the effects due to the first metal layer.

The second metal layer may contain a second binder resin. The first metal layer may contain no binder resin, or a volume proportion of a first binder resin in the first metal layer may be smaller than a volume proportion of the second binder resin in the second metal layer. The volume proportion of the first metal particles in the first metal layer may be greater than the volume proportion of the second metal particles in the second metal layer. Thereby, the first metal particles and the carbon particles contained in the carbon layer are likely to come into contact with each other, so that the contact resistance between the first metal layer and the carbon layer is more likely to be reduced.

Hereinafter, each metal layer will be described.

(First Metal Layer)

The first metal layer is adjacent to the carbon layer and contains the first metal particles.

The first metal particles are not particularly limited. From the viewpoint of conductivity, the first metal particles may contain silver. At least a part of the first metal particles may be agglomerated, fused to each other, or sintered in the first metal layer.

An average particle size of the first metal particles may be smaller than an average particle size of the second metal particles. Ratio (D1/D2) of average particle size D1 of the first metal particles to average particle size D2 of the second metal particles may be less than 1. Ratio (D1/D2) may be less than or equal to 0.5, and may be less than or equal to 0.1. Ratio (D1/D2) may be more than or equal to 0.0005, and may be more than or equal to 0.001.

Average particle size D1 may be more than or equal to 1 nm, and may be more than or equal to 5 nm. Average particle size D1 may be less than or equal to 1 µm, may be less than or equal to 500 nm, and may be less than or equal to 100 nm. Average particle size D1 is, for example, more than or equal to 1 nm and less than or equal to 1 µm.

The average particle size of the first metal particles can be obtained from the cross section, which is cut in the thickness direction, of the first metal layer. For example, an image of the cross section, which is cut in the thickness direction, of the first metal layer, taken by a scanning electron microscope (SEM) or a transmission electron microscope (TEM) at a magnification of 10,000 times or more, is ternarized to be divided into metal particle, binder resin, and void. Then, in an observation view of the image, any plurality (e.g., 10 particles) of metal particles are selected, and particle sizes of these metal particles are measured and averaged to obtain the average particle size of the metal particles. Here, the particle size of a metal particle may be defined by the diameter of a circle having the same area as the area of the cross section of the metal particle. When the metal particles are agglomerated, fused, or sintered in the first metal layer, the value obtained by dividing the total area of the multiple metal particles that have been agglomerated, fused, or sintered by a number of the metal particles is considered as the area of one metal particle. In this way, the particle size of these metal particles may be calculated (measured).

The average particle size of the first metal particles may be measured using a dynamic light scattering particle size analyzer. In this case, the average particle size of the first metal particles is 50% particle size D50 (i.e., median size) in a volume-based particle size distribution.

Volume proportion WM1 of the first metal particles in the first metal layer is not particularly limited as long as it exceeds 0% by volume. Volume proportion WM1 may be more than or equal to 80% by volume, may be more than or equal to 90% by volume, and may be 100% by volume.

Volume proportion WR1 of the first binder resin in the first metal layer may be smaller than volume proportion WR2 of the second binder resin in the second metal layer. The first metal layer may contain no binder resin, or contain the first binder resin. Volume proportion WR1 may be less than or equal to 40% by volume, may be less than or equal to 30% by volume, may be less than or equal to 20% by volume, and may be 0% by volume.

The binder resin is not particularly limited, and examples thereof include publicly known binder resins used for producing a cathode lead-out layer. Examples of the binder resin include thermoplastic resins (polyester resin, etc.) and thermosetting resins (polyimide resin, epoxy resin, etc.).

The composition of the first metal layer and the volume proportion of each component can be measured by, for example, energy dispersive X-ray spectroscopy (SEM-EDX).

The composition of the first metal layer and the volume proportion of each component in the first metal layer may be obtained from the cross section, which is cut in the thickness direction, of the first metal layer. For example, an image of the cross section, which is cut in the thickness direction, of the first metal layer, taken by a SEM or a TEM at a magnification of 10000 times or more, is ternarized to be divided into metal particle, binder resin, and void. Then, the area proportion of the metal particles and the area proportion of the binder resin in an observation view of the image are calculated, respectively. The calculated area proportions can be respectively considered as the volume proportion of the metal particles and the volume proportion of the binder resin in the first metal layer.

The thickness of the first metal layer is not particularly limited. The thickness of the first metal layer may be set according to the average particle size of the first metal particles. The thickness of the first metal layer may be more than or equal to 0.1 µm, and may be more than or equal to 3 µm. The thickness of the first metal layer may be less than or equal to 50 µm, and may be less than or equal to 10 µm. The thickness of the first metal layer is, for example, more than or equal to 3 µm and less than or equal to 10 µm. The thickness of the first metal layer is obtained by an average value of the thicknesses at any five measuring points of the cross section, which is cut in the thickness direction, of the first metal layer.

(Second Metal Layer)

The second metal layer covers at least a part of the first metal layer and contains the second metal particles.

The second metal particles are not particularly limited. From the viewpoint of conductivity, the second metal particles may contain silver.

The shape of each of the second metal particles is not particularly limited. The second metal particle may be in a spherical shape, may be in a flake shape in view of facilitating the electrical connection between metal particles, or may be a mixture of spherical particles and flaky particles. An average aspect ratio of the flaky particles is, for example, more than or equal to 1.5, and more than or equal to 2.

The average particle size of the second metal particles is not particularly limited, and may be greater than the average particle size of the first metal particles. Average particle size D2 of the second metal particles may be more than or equal to 0.1 µm, and may be more than or equal to 1 µm. Average particle size D2 may be less than or equal to 100 µm, and may be less than or equal to 20 µm. When the second metal particles include spherical particles, average particle size D2 of the spherical second metal particles may be, for example, more than or equal to 0.1 µm and less than or equal to 20 µm, and may be more than or equal to 0.5 µm and less than or equal to 10 µm. When the second metal particles include flaky particles, average particle size D2 of the flaky second metal particles may be, for example, more than or equal to 1 µm and less than or equal to 100 µm, and may be more than or equal to 5 µm and less than or equal to 20 µm. The average particle size of the second metal particles can be calculated from the cross section, which is cut in the thickness direction, of the second metal layer, similarly to the first metal particles. The average particle size of the second metal particles may be a median size obtained in the same way as for the first metal particles.

Volume proportion WM2 of the second metal particles in the second metal layer may be smaller than volume proportion WM1 of the first metal particles in the first metal layer. Volume proportion WM2 may be less than or equal to 80% by volume, and may be less than or equal to 50% by volume. Volume proportion WM2 may be more than or equal to 20% by volume, and may be more than or equal to 30% by volume. Volume proportion WM2 is, for example, more than or equal to 20% by volume and less than or equal to 50% by volume.

The second metal layer does not have to contain the second binder resin, but it is preferable to contain a binder resin from the viewpoint of adhesion. Volume proportion WR2 of the second binder resin in the second metal layer may be more than or equal to 20% by volume, and may be more than or equal to 50% by volume. Volume proportion WR2 may be less than or equal to 80% by volume, and may be less than or equal to 70% by volume. Volume proportion WR2 is, for example, more than or equal to 50% by volume and less than or equal to 80% by volume.

Examples of the second binder resin include the same resins as those of the first binder resin. The first binder resin and the second binder resin may be the same as or different from each other. The composition of the second metal layer and the volume proportion of each component can be measured by SEM-EDX or from the cross section, which is cut in the thickness direction, of the second metal layer, similarly to the first metal layer.

The thickness of the second metal layer is not particularly limited. The thickness of the second metal layer may be, for example, more than or equal to 0.1 µm and less than or equal to 50 µm, and may be more than or equal to 1 µm and less than or equal to 10 µm. The thickness of the second metal layer is obtained by an average value of the thicknesses at any five points of the cross section, which is cut in the thickness direction, of the second metal layer.

FIG. 1 is a cross-sectional view schematically illustrating the cathode lead-out layer according to the present exemplary embodiment.

Cathode lead-out layer 14 includes carbon layer 140 covering at least a part of a solid electrolyte layer (not shown), first metal layer 141 covering at least a part of carbon layer 140, and second metal layer 142 covering at least a part of first metal layer 141.

First metal layer 141 contains first metal particles 1411. First metal layer 141 can contain a binder resin or voids 1412. First metal particles 1411 are disposed along the unevenness of the surface of carbon layer 140. Second metal layer 142 contains second metal particles 1421, each having a spherical shape and a flake shape, that each have greater size than first metal particles 1411. Second metal layer 142 further contains second binder resin 1422. Second metal layer 142 may have voids.

When viewed from the normal direction of the cathode lead-out layer, the area of the first metal layer may be the same as or different from the area of the second metal layer. The first metal layer having a low content of the binder resin or a high content of the metal particles easily peels off from the carbon layer. The second metal layer may be formed to cover at least a part of the periphery of the first metal layer in view of suppressing the peeling of the first metal layer. In particular, it is preferable that the second metal layer covers the end portion (first end portion) of the first metal layer, which is located at a side close to a portion of the anode body that is joined to the anode lead terminal. This is because the first end portion of the first metal layer is particularly easy to peel off. The second metal layer may cover at least a part of the periphery of the first metal layer and at least a part of a region surrounding the first metal layer.

The periphery of the first metal layer is defined by, for example, a region from the outer edge of the first metal layer to a position toward the inside by up to 5% of the minimum width of the first metal layer. The region surrounding the first metal layer is defined by, for example, a region from the outer edge of the first metal layer to a position toward the outside by up to 5% of the minimum width of the first metal layer.

The second metal layer may be formed to have a larger area than the first metal layer and cover the entirety of the first metal layer. A layer containing metal particles having a small average particle size may shrink when heated. When the second metal layer is formed as described above, occurrence of peeling or cracks of the first metal layer can be easily suppressed even when the first metal layer shrinks. Thus, increases in the ESR and leakage current of the electrolytic capacitor are suppressed.

When the second metal layer covers the entirety of the first metal layer, a ratio (S2/S1) of area S2 of the second metal layer to area S1 of the first metal layer may be more than or equal to 1, and may be more than or equal to 1.1. Ratio (S2/S1) may be less than or equal to 2, and may be less than or equal to 1.5.

The first metal layer may be formed to avoid an edge portion of the anode body. That is, a part of the carbon layer that is disposed on the edge portion of the anode body does not have to be covered with the first metal layer. Further, the first metal layer may be formed not to face the side surface of the anode body. Thereby, occurrence of peeling or cracks of the first metal layer, due to, for example, shrinkage of the first metal layer, can be easily suppressed.

The edge portion of the anode body includes, for example, a region from the outer edge of one surface (first surface) of the anode body to a position toward the inside by up to 5% of the minimum width of the main surface of the anode body, and a region from the outer edge of a surface (second surface) intersecting the one surface to a position toward the inside by up to 5% of the above width. When the width of the first surface or the second surface is less than 5% of the minimum width of the main surface of the anode body, the first metal layer may not be formed on the entirety of the corresponding surface. Meanwhile, the larger the area of the first metal layer, the better the effect of reducing the ESR value. Hence, it is preferable that the area of the first metal layer is appropriately set to be enough large in consideration of the suppression of damage and the effect of reducing the ESR value.

Figure 2A:
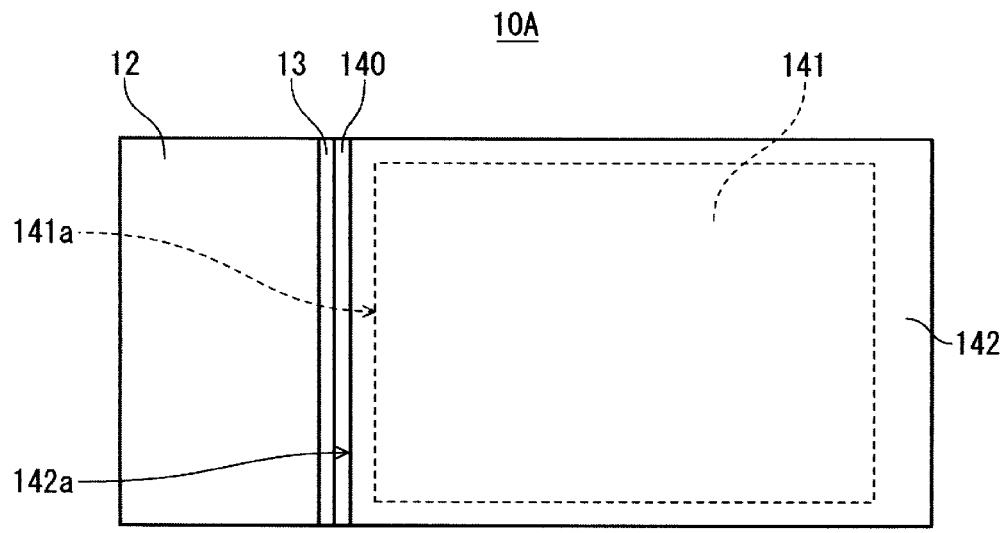
FIG. 2A is a top view schematically illustrating a capacitor element according to one exemplary embodiment of the present invention.
Figure 2B:
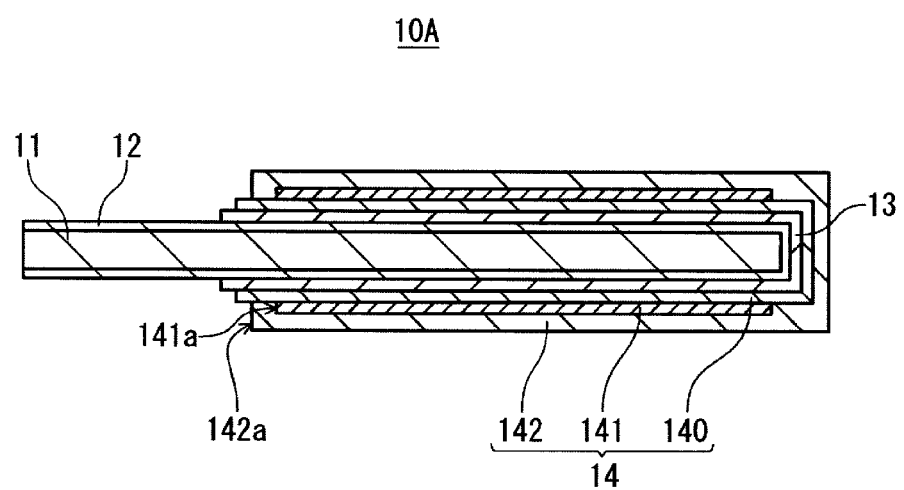
FIG. 2B is a cross-sectional view schematically illustrating the capacitor element shown in FIG. 2A.

FIG. 2A is a top view schematically illustrating a capacitor element according to the present exemplary embodiment. FIG. 2B is a cross-sectional view schematically illustrating the capacitor element shown in FIG. 2A.

Capacitor element 10A includes anode body 11, dielectric layer 12 covering at least a part of anode body 11, solid electrolyte layer 13 covering at least a part of dielectric layer 12, and cathode lead-out layer 14 covering at least a part of solid electrolyte layer 13. Cathode lead-out layer 14 includes carbon layer 140 covering at least a part of solid electrolyte layer 13, first metal layer 141 covering at least a part of carbon layer 140, and second metal layer 142 covering first metal layer 141.

First metal layer 141 is formed not to cover a part of carbon layer 140 that id disposed on the edge portion of anode body 11 (dielectric layer 12). An area of second metal layer 142 is larger than an area of first metal layer 141, and second metal layer 142 is formed to cover the entire surface of first metal layer 141. An end portion (second end portion 142a) of second metal layer 142, which is located at a side close to a portion of anode body 11 that is joined to the anode lead terminal (not shown), extends beyond first end portion 141a of first metal layer 141. First end portion 141a of first metal layer 141 is covered with second metal layer 142. First metal layer 141 is not formed in a region facing the side surface of anode body 11. Meanwhile, second metal layer 142 is formed in at least a part of the region facing the side surface of anode body 11.

Figure 3A:
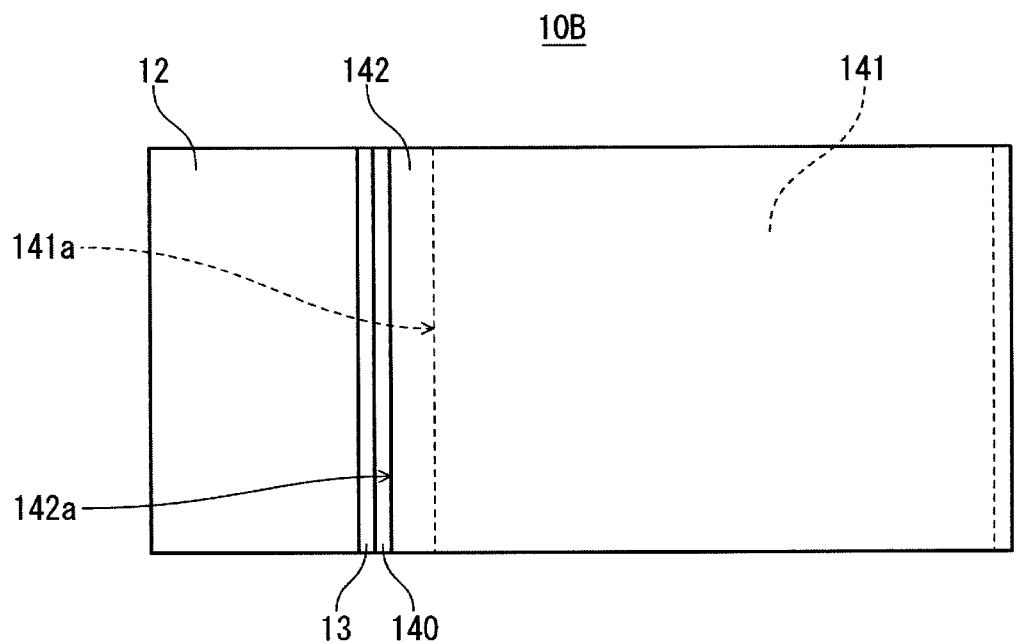
FIG. 3A is a top view schematically illustrating a capacitor element according to another exemplary embodiment of the present invention.
Figure 3B:
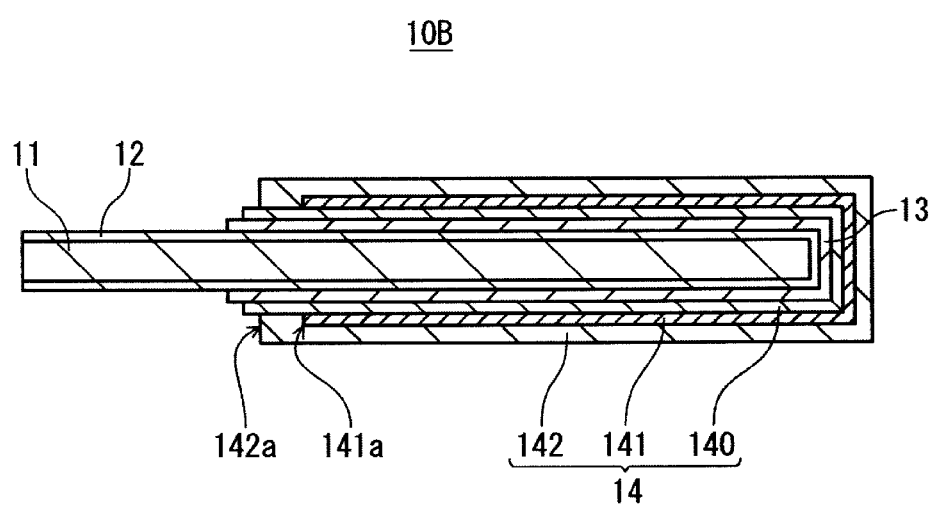
FIG. 3B is a cross-sectional view schematically illustrating the capacitor element shown in FIG. 3A.

FIG. 3A is a top view schematically illustrating another capacitor element according to the present exemplary embodiment. FIG. 3B is a cross-sectional view schematically illustrating the capacitor element shown in FIG. 3A.

Capacitor element 10B similarly includes anode body 11, dielectric layer 12 covering at least a part of anode body 11, solid electrolyte layer 13 covering at least a part of dielectric layer 12, and cathode lead-out layer 14 covering at least a part of solid electrolyte layer 13. Cathode lead-out layer 14 includes carbon layer 140 covering at least a part of solid electrolyte layer 13, first metal layer 141 covering at least a part of carbon layer 140, and second metal layer 142 covering first metal layer 141.

First metal layer 141 is formed to cover a part of anode body 11. First metal layer 141 covers a part of carbon layer 140 that id disposed on the edge portion of anode body 11. Second metal layer 142 is formed to cover the entire surface of first metal layer 141. Second end portion 142a of second metal layer 142 extends beyond first end portion 141a of first metal layer 141, and first end portion 141a of first metal layer 141 is covered with second metal layer 142. First metal layer 141 and second metal layer 142 are formed in at least a part of the region facing the side surface of anode body 11.

(Third Layer)

A third layer, which is other than the second metal layer, may be disposed on the main surface of the first metal layer that is opposite to the carbon layer. The third layer may be interposed between the first metal layer and the second metal layer, or may be disposed at the outermost side.

The configuration of the third layer is not particularly limited. When the third layer is interposed between the first metal layer and the second metal layer, the third layer may be conductive. When the third layer is disposed at the outermost side, the third layer may be conductive or non-conductive. The third layer having conductivity may contain, for example, the above binder resin and first metal particles, second metal particles, or other metal particles.

Hereinafter, the configuration of the electrolytic capacitor will be described more specifically with reference to the drawings as appropriate.

Figure 4:
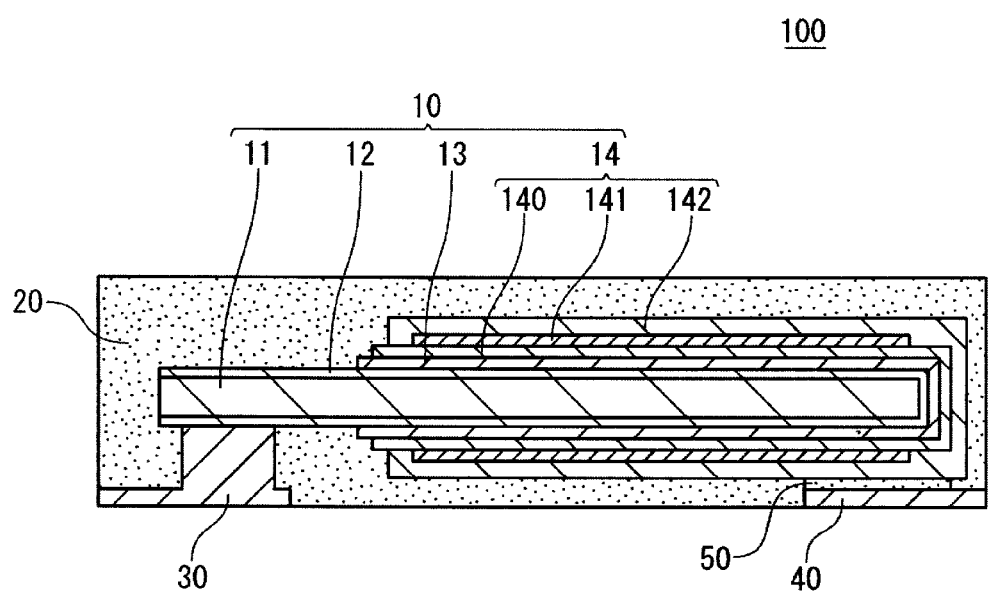
FIG. 4 is a cross-sectional view schematically illustrating an electrolytic capacitor according to one exemplary embodiment of the present invention.

FIG. 4 is a cross-sectional view schematically showing the structure of an electrolytic capacitor according to one exemplary embodiment of the present invention.

Electrolytic capacitor 100 includes capacitor element 10, exterior body 20 that seals capacitor element 10, anode lead terminal 30, and cathode lead terminal 40. At least a part of each of the terminals is exposed to the outside of the exterior body 20.

Capacitor element 10 includes anode body 11, dielectric layer 12 covering at least a part of anode body 11, solid electrolyte layer 13 covering at least a part of dielectric layer 12, and cathode lead-out layer 14 covering at least a part of solid electrolyte layer 13. Cathode lead-out layer 14 includes carbon layer 140 covering at least a part of solid electrolyte layer 13, first metal layer 141 covering at least a part of the carbon layer, and second metal layer 142 covering at least a part of first metal layer 141. Such capacitor element 10 is, for example, in a sheet shape or a flat plate shape.

Anode body 11 and anode lead terminal 30 are electrically connected, for example, by welding. Second metal layer 142 and cathode lead terminal 40 are electrically connected via adhesive layer 50 made, for example, of a conductive adhesive (such as a mixture of a thermosetting resin and carbon particles or metal particles).

The electrolytic capacitor may have at least one capacitor element, and may have a plurality of capacitor elements. A number of capacitor elements included in the electrolytic capacitor may be determined according to application.

(Anode Body)

The anode body includes a foil (metal foil) containing a valve metal as a conductive material or a porous sintered body containing a valve metal. An anode wire is planted from the porous sintered body. The anode wire is used for connection to the anode lead terminal. Examples of the valve metal include titanium, tantalum, aluminum, niobium, etc. The anode body may contain one or more of the above valve metals. The anode body may contain the valve metal in the form of: an alloy containing the valve metal; a compound containing the valve metal; or the like. The thickness of the anode body that is a metal foil is not particularly limited, and is, for example, more than or equal to 15 μm and less than or equal to 300 μm. The thickness of the anode body that is a porous sintered body is not particularly limited, and is, for example, more than or equal to 15 μm and less than or equal to 5 mm.

(Dielectric Layer)

The dielectric layer is formed, for example, by anodizing the surface of the anode body by anodizing treatment or the like. Thus, the dielectric layer can contain an oxide of the valve metal. For example, when aluminum is used as the valve metal, the dielectric layer contains $Al_2O_3$, and when tantalum is used as the valve metal, the dielectric layer contains $Ta_2O_5$. The dielectric layer is not limited to this, and may be any one that functions as a dielectric.

(Solid Electrolyte Layer)

The solid electrolyte layer may be formed to cover at least a part of the dielectric layer, and may be formed to cover the entire surface of the dielectric layer.

The solid electrolyte layer is formed of, for example, a manganese compound or a conductive polymer. As the conductive polymer, polypyrrole, polyaniline, polythiophene, polyacetylene, derivatives thereof, etc., can be used. The solid electrolyte layer containing the conductive polymer can be formed, for example, by chemically polymerizing and/or electrolytically polymerizing a raw material monomer on the dielectric layer. Alternatively, it can be formed by coating, to the dielectric layer, a solution in which the conductive polymer is dissolved or a dispersion liquid in which the conductive polymer is dispersed.

(Cathode Lead-Out Layer)

The cathode lead-out layer includes a carbon layer covering at least a part of the solid electrolyte layer, the first metal layer covering at least a part of the carbon layer, and the second metal layer covering the first metal layer.

The carbon layer contains, for example, conductive carbon particles and has conductivity. The carbon layer may contain, if necessary, a binder resin, additives, and/or the like, which will be described later. Examples of the additives include, for example, a dispersant, surfactant, antioxidant, preservative, base, acid, and/or the like. The configuration of the carbon layer is not limited to this, and may be any configuration having a current collecting function.

The average particle size of the carbon particles is, for example, more than or equal to 0.05 μm, and more than or equal to 0.1 μm. The average particle size of the carbon particles is, for example, less than or equal to 10 μm, and less than or equal to 5 μm. The average particle size of the carbon particles is a median size, or can be calculated from the cross section, which is cut in the thickness direction, of the carbon layer, similarly to the first metal particles.

(Lead Terminals)

The materials of the anode lead terminal and the cathode lead terminal are not particularly limited as long as they are electrochemically and chemically stable and have conductivity, and may be metallic or non-metallic.

The shapes of them are also not particularly limited.

(Exterior Body)

The exterior body is provided to electrically insulate the anode lead terminal and the cathode lead terminal, and includes an insulating material (exterior body material). The exterior body material includes, for example, a thermosetting resin. Examples of the thermosetting resin include, for example, an epoxy resin, phenol resin, silicone resin, melamine resin, urea resin, alkyd resin, polyurethane, polyimide, unsaturated polyester, etc. The exterior body material may contain a filler, curing agent, polymerization initiator, catalyst, and/or the like.

[Method for Producing Electrolytic Capacitor]

The method for producing the above electrolytic capacitor includes: a step (S2) of forming a dielectric layer to cover at least a part of an anode body; a step (S3) of forming a solid electrolyte layer to cover at least a part of the dielectric layer; a step (S4) of adhering a carbon paste to at least a part of the solid electrolyte layer to form a carbon layer; a step (S5) of adhering a first metal paste to at least a part of the carbon layer; and a step (S6) of adhering a second metal paste to cover at least a part of the first metal paste.

The method for producing the electrolytic capacitor may further include, before the step of forming a dielectric layer, a step (S1) of preparing an anode body. In addition, the method for producing the electrolytic capacitor can further include: a step (S7) of electrically connecting lead terminals to a capacitor element; and a step (sealing step, S8) of covering the capacitor element and a part of each of the lead terminals with an exterior body.

Figure 5:
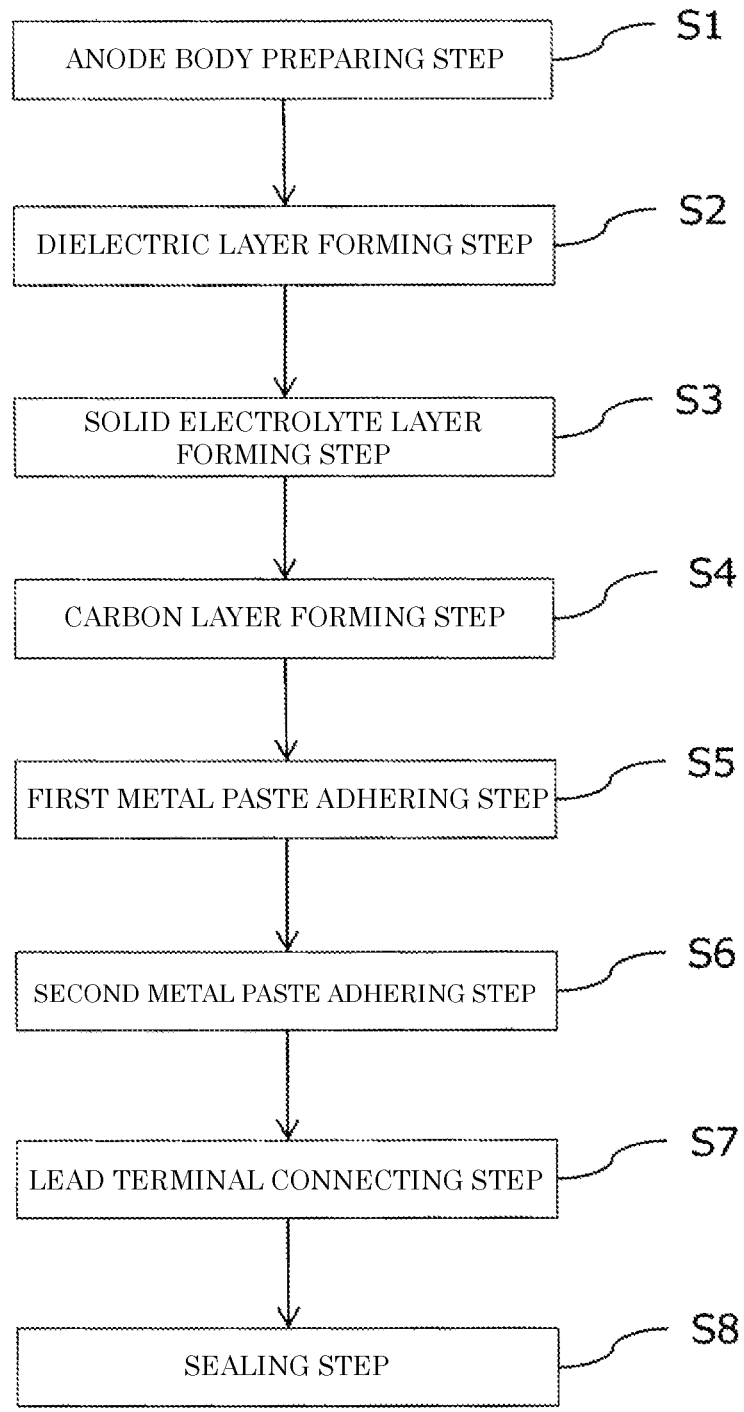
FIG. 5 is a flowchart showing a method for producing an electrolytic capacitor according to one exemplary embodiment of the present invention.

FIG. 5 is a flowchart showing a method for producing the electrolytic capacitor according to the present exemplary embodiment.

Hereinafter, each step will be described in more detail.

(1) Step of Preparing Anode Body

The anode body can be prepared, for example, by roughening a surface of a foil-shaped or plate-shaped base material containing a valve metal. The roughening only needs to form unevenness on the surface of the base material, and may be performed, for example, by etching (e.g., electrolytically etching) the surface of the base material.

Alternatively, an anode body having a porous structure may be formed by molding powder of a valve metal into a desired shape (e.g., a block shape) to obtain a molded body, and then sintering the molded body.

(2) Step of Forming Dielectric Layer

The dielectric layer is formed, for example, by anodizing the anode body. The anodization can be performed by a publicly known method, for example, an anodizing treatment. The anodizing treatment can be performed, for example, by: immersing the anode body in an anodizing liquid to impregnate the surface of the anode body with the anodizing liquid; and applying a voltage between the anode body as an anode and a cathode immersed in the anodizing liquid.

(3) Step of Forming Solid Electrolyte Layer

The solid electrolyte layer is formed, for example, by applying a treatment liquid containing a conductive polymer to the anode body on which the dielectric layer is formed, and then drying it. The treatment liquid may further contain other components such as a dopant. As the conductive polymer, for example, poly(3,4-ethylenedioxythiophene) (PEDOT) is used. As the dopant, for example, polystyrenesulfonic acid (PSS) is used. The treatment liquid is, for example, a dispersion liquid of the conductive polymer or a solution of the conductive polymer. Examples of a dispersion medium (solvent) include water, an organic solvent, and a mixture thereof. The solid electrolyte layer may also be formed by chemically polymerizing and/or electrolytically polymerizing the raw material monomer of the conductive polymer on the dielectric layer.

(4) Step of Forming Carbon Layer

The carbon layer is formed by using a carbon paste.

The carbon paste contains carbon particles and a dispersion medium. As the dispersion medium, water, an organic medium, or a mixture thereof is used. The carbon paste can contain, if necessary, a binder resin, additives, and/or the like.

A proportion of carbon particles in the solid content of the carbon paste is, for example, more than or equal to 60% by mass, and may be more than or equal to 70% by mass. The proportion of carbon particles is not particularly limited, but is, for example, less than or equal to 99% by mass.

The method for adhering the carbon paste to the solid electrolyte layer is not particularly limited. For example, the anode body provided with the solid electrolyte layer may be immersed in the carbon paste, or the carbon paste may be coated to the surface of the solid electrolyte layer using a publicly known coater or the like.

The carbon layer may be formed by adhering the carbon paste to at least a part of the solid electrolyte layer to form a coated film and then drying it. After being formed, the coated film may be further heated. The temperature at the time of the heating is, for example, higher than or equal to 150° C. and lower than or equal to 300° C.

(5) Step of Adhering First Metal Paste

The first metal paste is adhered to at least a part of the carbon layer. Thereby, the first metal layer is formed. Alternatively, the first metal layer is formed by drying and/or heating the first metal paste, as described later.

The method for adhering the first metal paste to the carbon layer is not particularly limited. For example, the first metal paste may be coated to the surface of the carbon layer using a publicly known coater or the like, or may be adhered to the surface of the carbon layer by an inkjet method. Alternatively, the anode body provided with the carbon layer may be immersed in the first metal paste.

The first metal paste contains the first metal particles, and may contain, if necessary, a first binder resin, a dispersion medium, additives, and the like. Examples of the dispersion medium include water, an organic media, and a mixture thereof.

It is preferable that a mass proportion of the first binder resin in the solid content of the first metal paste is smaller than a mass proportion of a second binder resin in the solid content of the second metal paste. A mass proportion of the first metal particles in the solid content of the first metal paste may be, for example, more than or equal to 80% by mass, may be more than or equal to 90% by mass, or may be 100% by mass.

After being adhered, the first metal paste may be dried and/or heated. Thereby, the dispersion medium is removed, and when a thermosetting resin is used as the binder resin, the binder resin is cured. Due to the heating, the first metal particles may be agglomerated, fused, or sintered with each other.

The heating conditions are not particularly limited. The heating temperature may be, for example, higher than or equal to 80° C. and lower than or equal to 250° C. The heating time may be, for example, more than or equal to 10 seconds and less than or equal to 60 minutes. Since the first metal paste contains none or an extremely small amount of the binder resin, the heating temperature may be lower than the temperature at which the second metal paste is heated. The heating time may also be shorter than the time for heating the second metal paste.

(6) Step of Adhering Second Metal Paste

The second metal paste is adhered to cover at least a part of the first metal paste. Thereby, the second metal layer covering at least a part of the first metal layer is formed. At this time, the second metal paste may be adhered to cover at least a part of the periphery of the first metal paste. The periphery of the first metal paste is, for example, a region from the outer edge of the first metal paste to a position toward the inside by up to 5% of the minimum width of the first metal paste. The second metal paste can be adhered to the first metal paste by the same method as described as the method for adhering the first metal paste.

The second metal paste contains second metal particles, preferably contains a second binder resin, and contains, if necessary, a dispersion medium, additives, etc.

A proportion of the second metal particles in the solid content of the second metal paste is, for example, more than or equal to 80% by mass, and may be more than or equal to 90% by mass. The proportion of the second metal particles is, for example, less than or equal to 100% by mass, and may be less than or equal to 98% by mass.

A proportion of the second binder resin in the solid content of the second metal paste is, for example, more than or equal to 1% by mass, and may be more than or equal to 2% by mass. The proportion of the second binder resin is, for example, less than or equal to 20% by mass, and may be less than or equal to 10% by mass.

After being adhered, the second metal paste is dried and/or heated. Thereby, the dispersion medium is removed, and when a thermosetting resin is used as the binder resin, the binder resin is cured.

The heating conditions are not particularly limited. The second metal paste may be dried under the same conditions as for the drying of the first metal paste. The heating temperature of the second metal paste containing a binder resin may be, for example, higher than or equal to 100° C. and lower than or equal to 250° C. The heating time may be, for example, more than or equal to 1 minute and less than or equal to 60 minutes.

The first metal paste and the second metal paste may be simultaneously dried and/or heated after the second metal paste is adhered to the first metal paste that has not been dried and/or heated. When the second metal paste is adhered to the first metal paste that contains a solvent, the infiltration of the binder resin contained in the second metal paste into the first metal paste is easily suppressed. Thus, the volume proportion of the first metal particles in the first metal layer easily becomes high, the volume proportion of the binder resin easily becomes low. Thus, the contact resistance between the carbon layer and the first metal layer is more likely to be reduced. Alternatively, when the first metal paste is dried and/or heated before the second metal paste is adhered, the solvent in the first metal paste is easily removed, so that the contact resistance between the carbon layer and the first metal layer is more likely to be reduced, as well.

(7) Step of Connecting Lead Terminals

The anode lead terminal is electrically connected to the anode body, and the cathode lead terminal is electrically connected to the cathode lead-out layer. The electrical connection between the anode body and the anode lead terminal is made, for example, by welding them. The electrical connection between the cathode lead-out layer and the cathode lead terminal is made, for example, by adhering the cathode lead-out layer and the cathode lead terminal via a conductive adhesive layer.

(8) Sealing Step

The capacitor element and a part of each of the lead terminals are covered with the exterior body. More specifically, after the capacitor element and the lead terminals are electrically connected, the capacitor element and a part of each of the lead terminals are covered with a resin that constitutes the resin exterior body, whereby they can be sealed.

The exterior body can be formed by using a molding technique such as injection molding, insert molding, or compression molding. The exterior body can be formed by, for example, using a predetermined mold and filling predetermined portions of the mold with a curable resin composition or a thermoplastic resin (composition) so as to cover the capacitor element and one end portion of each of the lead terminals. When a laminate of a plurality of the capacitor elements is used, a resin exterior body may be formed to cover the laminate and a part of each of the lead terminals.

EXAMPLES

Hereinafter, the present invention will be specifically described based on examples and comparative examples, but the present invention is not limited to the following examples.

Example 1

Twenty electrolytic capacitors shown in FIG. 4 were produced in the following way in order to evaluate their characteristics. These electrolytic capacitors correspond to the first aspect and the second aspect.

(1) Production of Electrolytic Capacitor

An aluminum foil (thickness: 100 µm) was prepared as a base material. The surface of the aluminum foil was etched to obtain an anode body. By immersing the anode body in an anodizing solution and applying a DC voltage of 70 V for 20 minutes, a dielectric layer containing aluminum oxide ($Al_2O_3$) was formed on the surface of the anode body.

After being immersed in an aqueous dispersion liquid (concentration 2% by mass) of poly(3,4-ethylenedioxythiophene) (PEDOT) doped with polystyrene sulfonic acid (PSS), the anode body on which the dielectric layer was formed was dried to form a solid electrolyte layer.

After a dispersion liquid (carbon paste) in which flaky graphite particles were dispersed in water was coated to the solid electrolyte layer, it was heated at 200° C., whereby a carbon layer was formed on the surface of the solid electrolyte layer.

Next, a first metal paste containing silver particles (average particle size 80 nm, content 90% by mass) and a solvent (butyl carbitol) was coated to the surfaces of the carbon layers on both main surfaces of the anode body.

Subsequently, a second metal paste containing silver particles (average particle size 1000 nm, content about 86% by mass), a binder resin (epoxy resin, content about 5% by mass), and a solvent (butyl carbitol) was coated. Finally, it was heated at 200° C. for 10 minutes to form a first metal layer (thickness 5 µm) and a second metal layer (thickness 5 µm). Thereby a capacitor element was obtained.

The areas of the first metal layer and the second metal layer on the main surface of the anode body were made equal to each other. The first metal layer and the second metal layer were also formed in at least a part of a region facing the side surface of the anode body.

Volume proportion WM1 of the first metal particles in the first metal layer was more than 99% by volume, and volume proportion WR1 of the first binder resin was less than 1% by volume. Volume proportion WM2 of the second metal particles in the second metal layer was about 33% by volume, and volume proportion WR2 of the second binder resin was about 67% by volume.

The obtained capacitor element, an anode lead terminal, a cathode lead terminal, and an adhesive layer were disposed, and an exterior body was formed using an epoxy resin containing silica particles as the filler. Thereby, electrolytic capacitor X1 was produced.

Example 2

Twenty electrolytic capacitors X2 were produced in the same way as in Example 1 except that the thickness of each of the first metal layer and the second metal layer was set to 10 µm.

Comparative Example 1

Twenty electrolytic capacitors Y1 were produced in the same way as in Example 1 except that only the second metal paste was coated. The thickness of a second metal layer formed was 10 µm.

Example 3

Twenty electrolytic capacitors X3 were produced in the same way as in Example 1 except that instead of the first metal paste prepared in Example 1, a first metal paste of Example 3 containing silver particles (average particle size 80 nm, content about 83.2% by mass), a binder resin (epoxy resin, content about 4.4% by mass), and a solvent (butyl carbitol) was coated.

Volume proportion WM1 of the silver particles in a first metal layer formed by the first metal paste of Example 3 was about 67% by volume, and volume proportion WR1 of the binder resin was about 33% by volume. The thicknesses of each of the comparative metal layer and a second metal layer formed was 5 µm.

Comparative Example 2

Twenty electrolytic capacitors Y2 were produced in the same way as in Example 1 except that only the first metal paste prepared in Example 3 was coated. The thickness of a first metal layer formed was 5 µm.

Comparative Example 3

Twenty electrolytic capacitors Y3 were produced in the same way as in Example 1 except that only the first metal paste prepared in Example 1 was coated. The thickness of a first metal layer formed was 5 µm.

The electrolytic capacitors X1 to X3, Y1 to Y3 produced above were evaluated as follows.

[ESR Value]

ESR values (mΩ) of the electrolytic capacitors at a frequency of 100 kHz were measured using an LCR meter for 4-terminal measurement under an environment of 20° C., and the average values thereof were calculated. Difference ratio (ESR relative value) of average ESR values (A) of the electrolytic capacitors X1 to X3, Y2, Y3 with respect to average ESR value (AO) of the electrolytic capacitors Y1 were calculated by the following expression. Evaluation results are shown in Table 1.

ESR relative value(%)=(A−A0)/A0×100

However, the ESR value of the electrolytic capacitors Y3 could not be measured. When the electrolytic capacitor Y3 was disassembled, it was found that the first metal layer had peeled off.

TABLE 1

| Electrolytic capacitor | X1 | X2 | Y1 | X3 | Y2 |
|---|---|---|---|---|---|
| ESR relative value | −32% | −31% | — | −21% | +5% |

The ESR values of the electrolytic capacitors X1 to X3 having the first metal layer were both much lower than the ESR value of the electrolytic capacitors Y1 having only the second metal layer or the ESR value of the electrolytic capacitors Y2 having only the first metal layer. Further, the ESR values of the electrolytic capacitors X1 and X2 were kept lower than those of the electrolytic capacitors X3 having the first metal layer formed by the first metal paste containing the binder resin.

Example 4

Twenty electrolytic capacitors X4 were produced in the same way as in Example 1 except that six capacitor elements produced in Example 1 were laminated.

Comparative Example 4

Twenty electrolytic capacitors Y4 were produced in the same way as in Example 1 except that seven capacitor elements produced in Comparative example 1 were laminated.

The ESR values of the electrolytic capacitors X4 and Y4 were measured in the same way as described above. Although the electrolytic capacitors X4 were smaller in a number of laminated capacitor elements than the electrolytic capacitors Y4, their ESR value was about 22% lower than that of the electrolytic capacitors Y4.

Example 5

Twenty electrolytic capacitors X5 were produced in the same way as in Example 1 except that a first metal layer and a second metal layer were formed as shown in FIGS. 2A and 2B. The electrolytic capacitors X5 correspond to the third aspect. The first metal layer is formed to be away from the periphery of the main surface of the anode body. An average value of ratio (S2/S1) of area S2 of the second metal layer to area S1 of the first metal layer in the electrolytic capacitors X5 was 1.35.

Example 6

Twenty electrolytic capacitors X6 were produced in the same way as in Example 1 except that a first metal layer and a second metal layer were formed as shown in FIGS. 3A and 3B. The electrolytic capacitors X6 correspond to the third aspect. The first metal layer is formed so that the end portions, other than the first end portion, reach up to the periphery of the main surface of the anode body. The second metal layer extends beyond the first end portion of the first metal layer. An average value of ratio (S2/S1) of area S2 of the second metal layer to area S1 of the first metal layer in the electrolytic capacitors X6 was 1.19.

ESR relative values of electrolytic capacitors X5 and X6 were obtained in the same way as described above. Results are shown in Table 2.

TABLE 2

| Electrolytic capacitor | X5 | X6 | Y1 |
|---|---|---|---|
| ESR relative value | −18% | −22% | — |

The ESR values of electrolytic capacitors X5 and X6 having the first metal layer were both much lower than the ESR value of electrolytic capacitors Y1 having only the second metal layer.

Comparative Example 5

Ten capacitor elements y5 were produced in the same way as in Example 1 except that the area of the second metal layer was made smaller than the area of the first metal layer. Meanwhile, the end portions, other than the first end portion, of the first metal layer were covered with the second metal layer. An average value of ratio (S2/S1) of area S2 of the second metal layer to area S1 of the first metal layer in the capacitor elements y5 was 0.83.

Ten capacitor elements y5 obtained, ten capacitor elements x5 separately produced in the same way as in Example 5, and ten capacitor elements x6 produced in the same way as in Example 6 were evaluated as follows.
[Peelability]
Tape tests were conducted in accordance with JIS H 8504 in order to evaluate whether or not the first metal layer peeled off. Results are shown in Table 3. In the tape tests, an adhesive tape provided with a polyester base material was used. Table 3 shows a number of capacitor elements in which the first metal layer peeled off among the 10 capacitor elements for each of Example 5, Example 6, and Comparative example 5.

TABLE 3

| Capacitor element | x5 | x6 | y5 |
|---|---|---|---|
| Peelability | 0/10 | 1/10 | 10/10 |

Since the first metal layers of capacitor elements x5 and x6 were entirely covered with the second metal layers, the first metal layers of capacitor elements x5 and x6 were difficult to peel off compared with the first metal layers of capacitor elements y5.

The ESR of each of the electrolytic capacitors according to the above aspects of the present invention is reduced. Therefore, they can be used in various applications that require low ESR.

The invention claimed is:
1. An electrolytic capacitor comprising a capacitor element and an anode lead terminal, the capacitor element including: an anode body; a dielectric layer covering at least a part of the anode body; a solid electrolyte layer covering at least a part of the dielectric layer; and a cathode lead-out layer covering at least a part of the solid electrolyte layer, the anode lead terminal being connected to a first portion of the anode body, the first portion being exposed from the cathode lead-out layer,
the cathode lead-out layer including:
a carbon layer covering at least a part of the solid electrolyte layer,
a first metal layer covering at least a part of the carbon layer, and
a second metal layer covering at least a part of the first metal layer, wherein:
the first metal layer contains first metal particles,
the second metal layer contains second metal particles and a second binder resin,
the first metal layer contains no binder resin, or contains a first binder resin at a volume proportion smaller than a volume proportion of the second binder resin in the second metal layer,
the first metal layer has a first end portion located at a side close to the first portion of the anode body,
the second metal layer has a second end portion located at a side close to the first portion of the anode body, and
the second metal layer extends to cover the first end portion so that the second end portion reaches a position beyond the first end portion.
2. The electrolytic capacitor according to claim 1, wherein a volume proportion of the first metal particles in the first metal layer is greater than a volume proportion of the second metal particles in the second metal layer.
3. The electrolytic capacitor according to claim 1, wherein an area of the second metal layer is larger than an area of the first metal layer.
4. The electrolytic capacitor according to claim 1, wherein an average particle size of the first metal particles is smaller than an average particle size of the second metal particles.
5. The electrolytic capacitor according to claim 1, wherein the second metal layer covers an entirety of the first metal layer.
6. The electrolytic capacitor according to claim 1, wherein a part of the carbon layer is in contact with the second metal layer, the part of the carbon layer being disposed on an edge portion of the anode body.

7. The electrolytic capacitor according to claim 1, wherein a part of the carbon layer is not covered with the first metal layer, the part of the carbon layer being disposed on an edge portion of the anode body.

8. The electrolytic capacitor according to claim 1, wherein:
the first metal particles contain silver, and
the second metal particles contain silver.

9. The electrolytic capacitor according to claim 1, wherein an average particle size of the first metal particles is more than or equal to 1 nm and less than or equal to 1 μm.

10. The electrolytic capacitor according to claim 1, wherein at least a part of the first metal particles in the first metal layer are sintered with each other.

11. The electrolytic capacitor according to claim 1, wherein the second metal layer is in contact with the carbon layer at the position beyond the first end portion.

12. An electrolytic capacitor comprising a capacitor element and an anode lead terminal, the capacitor element including: an anode body; a dielectric layer covering at least a part of the anode body; a solid electrolyte layer covering at least a part of the dielectric layer; and a cathode lead-out layer covering at least a part of the solid electrolyte layer, the anode lead terminal being connected to a first portion of the anode body, the first portion being exposed from the cathode lead-out layer,
the cathode lead-out layer including:
a carbon layer covering at least a part of the solid electrolyte layer,
a first metal layer covering at least a part of the carbon layer, and
a second metal layer covering at least a part of the first metal layer, wherein:
the first metal layer contains first metal particles,
the second metal layer contains second metal particles,
a volume proportion of the first metal particles in the first metal layer is greater than a volume proportion of the second metal particles in the second metal layer,
the first metal layer has a first end portion located at a side close to the first portion of the anode body,
the second metal layer has a second end portion located at a side close to the first portion of the anode body, and
the second metal layer extends to cover the first end portion so that the second end portion reaches a position beyond the first end portion.

13. The electrolytic capacitor according to claim 12, wherein: the second metal layer further contains a second binder resin.

14. The electrolytic capacitor according to claim 12, wherein an area of the second metal layer is larger than an area of the first metal layer.

15. The electrolytic capacitor according to claim 12, wherein an average particle size of the first metal particles is smaller than an average particle size of the second metal particles.

16. The electrolytic capacitor according to claim 12, wherein the second metal layer covers an entirety of the first metal layer.

17. The electrolytic capacitor according to claim 12, wherein the second metal layer is in contact with the carbon layer at the position beyond the first end portion.

18. An electrolytic capacitor comprising a capacitor element and an anode lead terminal, the capacitor element including: an anode body; a dielectric layer covering at least a part of the anode body; a solid electrolyte layer covering at least a part of the dielectric layer; and a cathode lead-out layer covering at least a part of the solid electrolyte layer, the anode lead terminal being connected to a first portion of the anode body, the first portion being exposed from the cathode lead-out layer,
the cathode lead-out layer including:
a carbon layer covering at least a part of the solid electrolyte layer,
a first metal layer covering at least a part of the carbon layer, and
a second metal layer covering at least a part of the first metal layer, wherein:
the first metal layer contains first metal particles,
the second metal layer contains second metal particles,
an average particle size of the first metal particles is smaller than an average particle size of the second metal particles,
the first metal layer has a first end portion located at a side close to the first portion of the anode body,
the second metal layer has a second end portion located at a side close to the first portion of the anode body, and
the second metal layer extends to cover the first end portion so that the second end portion reaches a position beyond the first end portion.

19. The electrolytic capacitor according to claim 18, wherein the second metal layer covers an entirety of the first metal layer.

20. The electrolytic capacitor according to claim 18, wherein the second metal layer is in contact with the carbon layer at the position beyond the first end portion.

21. A method for producing an electrolytic capacitor, comprising the steps of:
forming a dielectric layer to cover at least a part of an anode body;
forming a solid electrolyte layer to cover at least a part of the dielectric layer;
adhering a carbon paste to at least a part of the solid electrolyte layer to form a carbon layer;
adhering a first metal paste to at least a part of the carbon layer to form a first metal layer;
adhering a second metal paste to cover at least a part of the first metal layer to form a second metal layer, and
connecting an anode lead terminal to a first portion of the anode body, the first portion being exposed from the carbon layer, the first metal layer, and the second metal layer, wherein:
the first metal paste contains first metal particles,
the second metal paste contains second metal particles and a second binder resin,
the first metal paste contains no binder resin, or contains a first binder resin in a mass proportion in a solid content of the first metal paste smaller than a mass proportion of the second binder resin in a solid content of the second metal paste,
the first metal layer has a first end portion located at a side close to the first portion of the anode body,
the second metal layer has a second end portion located at a side close to the first portion of the anode body, and
the second metal layer extends to cover the first end portion so that the second end portion reaches a position beyond the first end portion.

22. The electrolytic capacitor according to claim 21, wherein the second metal layer is in contact with the carbon layer at the position beyond the first end portion.

23. A method for producing an electrolytic capacitor, comprising the steps of:
forming a dielectric layer to cover at least a part of an anode body;

forming a solid electrolyte layer to cover at least a part of the dielectric layer;

adhering a carbon paste to at least a part of the solid electrolyte layer to form a carbon layer;

adhering a first metal paste to at least a part of the carbon layer to form a first metal layer;

adhering a second metal paste to cover at least a part of the first metal layer to form a second metal layer, and connecting an anode lead terminal to a first portion of the anode body, the first portion being exposed from the carbon layer, the first metal layer, and the second metal layer, wherein:

the first metal paste contains first metal particles, the second metal paste contains second metal particles, an average particle size of the first metal particles is smaller than an average particle size of the second metal particles, the first metal layer has a first end portion located at a side close to the first portion of the anode body, the second metal layer has a second end portion located at a side close to the first portion of the anode body, and the second metal layer extends to cover the first end portion so that the second end portion reaches a position beyond the first end portion.

24. The electrolytic capacitor according to claim 23, wherein the second metal layer is in contact with the carbon layer at the position beyond the first end portion.

* * * * *